Figure 1:
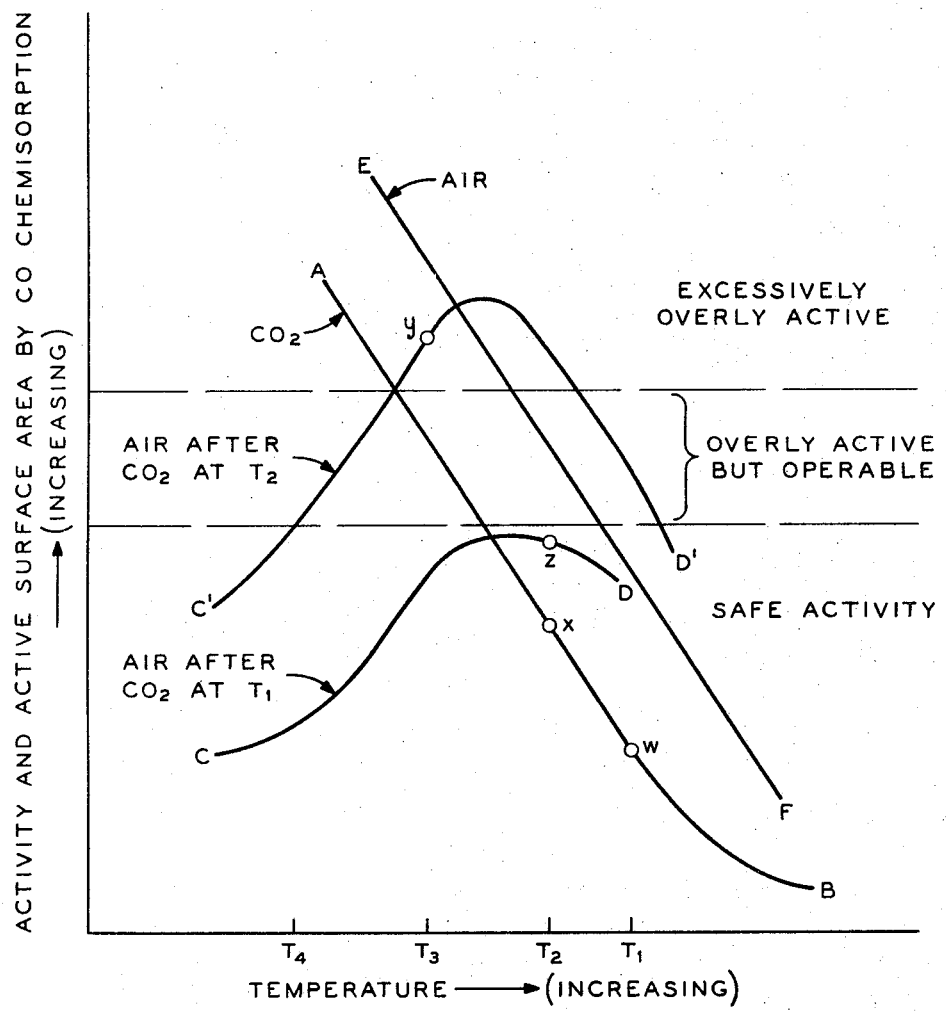

United States Patent Office 3,346,658
Patented Oct. 10, 1967

3,346,658
METHOD FOR ADJUSTING THE INITIAL
ACTIVITY OF CHROMIA-ALUMINA
CATALYSTS
Bernard F. Mulaskey, Point Richmond, Hugh F. Harnsberger, San Anselmo, and Robert H. Lindquist, Berkeley, Calif., assignors to Chevron Research Company, a corporation of Delaware
Filed Jan. 27, 1964, Ser. No. 340,200
9 Claims. (Cl. 260—680)

This application is a continuation-in-part of our copending application Ser. No. 71,821, filed Nov. 25, 1960, now U.S. Patent No. 3,189,661.

This invention relates to catalytic hydrocarbon dehydrogenation processes and supported metal oxide catalysts used therein. More particularly, the invention relates to chromia-alumina catalysts and their preparation for use in processes of the cyclically operated, so-called adiabatic, fixed bed type, for dehydrogenating butane and mixtures of butane and butenes to butenes and butadiene.

In the so-called adiabatic, fixed bed, butane dehydrogenation process, normal butane or a mixture of butane and butenes at elevated temperatures of 900–1200° F. are passed at subatmospheric pressure in the range of 1–10 p.s.i.a. through a bed of chromia-alumina catalyst particles preheated to the reaction temperature, at a space velocity of 0.5–3 volumes per volume of catalyst per hour. Frequently, heat retentive, catalytically inert, refractory solid particles are mixed with the catalyst particles, the heat required for the endothermic dehydrogenation reaction being abstracted from the pre-heated catalyst and inert solids. The temperature of the catalyst bed decreases as it gives up heat absorbed by the reaction, and at the same time a carbonaceous deposit or coke is laid down on the catalyst. The feed is stopped after an on-stream period of 5–30 minutes. The bed is then contacted with a heated stream of oxygen-containing gas at 900–1200° F. for an equivalent length of time, which serves to burn off the carbonaceous deposit to regenerate the catalyst, and thereby to restore the bed to the initial elevated temperature, whereupon the cycle is repeated. Thus, the catalyst is alternately and repeatedly exposed at frequent intervals to hydrocarbon vapors under conversion conditions and to oxygen-containing gases under regeneration conditions. Usually several reactors are used in parallel, and while one reactor is in the reaction period or cycle, another is in the regeneration period.

The requirements for a catalyst to be used in such a process are very stringent, for the catalyst must be extremely rugged to withstand the repeated oxidation and reduction and yet have good activity. It is desirable that the catalyst have a favorable coke:conversion ratio because the heat released when the coke is burned is retained in the catalyst bed to supply heat for the endothermic dehydrogenation reaction. The catalysts used commercially are composed essentially of chromia ($Cr_2O_3$) supported on alumina, and they may be promoted with a minor amount of an alkali metal oxide such as sodium or potassium oxide to improve selectivity. An unusual feature of the process is that, whereas in most catalytic processes it is desirable to use the most active catalyst available, in the cyclically operated fixed bed butane dehydrogenation process it is not desirable to use the most active catalyst. There is a great danger in the process that, if excess coke is produced, the temperature reached in the catalyst bed during regeneration will be so excessively high as to severely damage the catalyst and/or equipment. It is a characteristic of the process and catalysts that coke production increases with increasing temperature and increasing activity. Therefore, if excess coke is ever produced, causing a high temperature on regeneration, in the subsequent conversion cycle there will be an increased production of coke, leading to a still higher temperature on regeneration, and so on, in a "runaway" self-destructive manner.

When starting up the process with a fresh catalyst charge, it has frequently been found that the catalyst is overly active or has an unfavorable coke:conversion ratio such that it is necessary to use low feed and air temperatures and low per-pass conversions for a time ranging from a few days to a week or more until the catalyst has lost its initial high activity. As the catalyst loses activity, the temperature can be raised to increase conversion and/or to compensate for a lower coke:conversion ratio. The activity of the catalyst may then reach a stable desired activity, but usually with known prior art catalysts the activity continues to decline, and the temperature must be continually increased to maintain desired production rates.

In a particular process, therefore, the catalyst used should have a desired activity within a safe operating range of activities, and preferably not exceeding a maximum safe activity. The desired activity, safe operating range of activity, and maximum safe activity are not absolute intrinsic properties of the catalyst, but depend also on the manner in which the process is operated. Since in processes of this type the catalyst particles are often mixed with inert heat retentive solid particles in the catalyst bed, the activity desired of the catalyst per se depends on the relative amounts of catalyst and inert used. The more active the catalyst, the more it can be diluted with inert solids. When the catalyst activity declines, however, the apparent activity decline is magnified in proportion to the amount of inert solids used, and the observed general rule has been that the higher the catalyst activity, the more rapidly it will decline. Thus, the most desired property for the catalyst itself is that it have stable activity, provided that this stable activity is adequate to maintain desired conversion at fixed dilution with inert solids, and provided that the coke:conversion ratio is suitable. The desired conversion may also depend on plant circumstances, and the desired catalyst activity may vary accordingly. Where butane is expensive, for example, lower per-pass conversion may be economically more attractive than high conversion operation because better selectivity may be obtained, producing more butadiene and less light gases per pound of butane.

In our copending application, Serial No. 71,821, filed Nov. 25, 1960, of which the present application is a continuation-in-part, there are disclosed chromia-alumina catalysts capable of providing this most desired situation of stable activity. As disclosed in said prior-filed copending application, catalysts of highly unusual and desirable properties can be prepared by heat treating a high surface area alumina support at 1100–1600° F. for 2–24 hours to reduce its B.E.T. (nitrogen absorption) surface area, then impregnating with sufficient chromium compound decomposable to $Cr_2O_3$ to give 25–40 weight percent $Cr_2O_3$ on the finished catalyst, and then heating the chromium-impregnated alumina in an oxygen-free atmosphere at 1100–1700° F. for 2–48 hours to reduce the active chromia surface area, as measured by CO chemisorption, to less than 15 micromoles CO per gram of catalyst. In this way, as disclosed, catalysts were prepared which had initially lower activity than previously used catalysts, but the new catalysts were characterized by their activity increasing (instead of declining) during an initial period of use in the butane dehydrogenation process, by their activity thereafter remaining relatively stable, and by their activity ultimately declining more slowly than that of the previously used catalysts.

It has since been found that even in the case of these new improved catalysts the above-mentioned problem of too high an activity can sometimes arise, by virtue of the catalyst activity increasing too much during the initial period of use.

The present invention provides methods for adjusting the initial activity of chromia-alumina catalysts, including the new catalysts disclosed in our copending application Serial No. 71,821, such that too high an activity is prevented from being attained in the process.

In accordance with the present invention a chromia-alumina catalyst which would normally be overly active for butane dehydrogenation, when first used in a fixed bed cyclic dehydrogenation process, is prepared for use in the process by treating the catalyst with flowing hot vapor free of oxygen at between 1400° F. and 1800° F. until the butane dehydrogenation activity of the catalyst has been decreased to lower than desired for use in the process, and then treating the catalyst with flowing hot vapor containing oxygen at between 1000° F. and 1800° F., but preferably not hotter than treated in the preceding step, until the butane dehydrogenation activity of the catalyst has been increased to an activity desired for use in the process. In one embodiment, the treating with hot vapor free of oxygen, and the treating with hot vapor containing oxygen, are controlled with respect to temperatures and times so as to adjust the butane dehydrogenation activity of the catalyst to substantially the maximum activity at which excessively high temperatures are not reached in the catalyst bed during regeneration in startup operation of the process at desired high per-pass conversion operation, i.e., the maximum safe activity.

Figure 2:
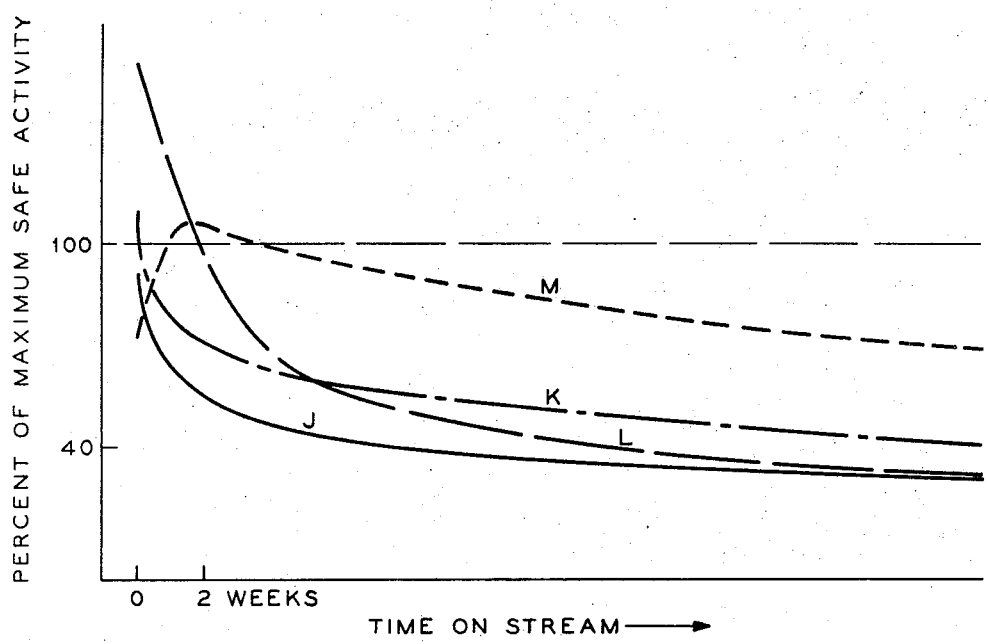
Figure 3:
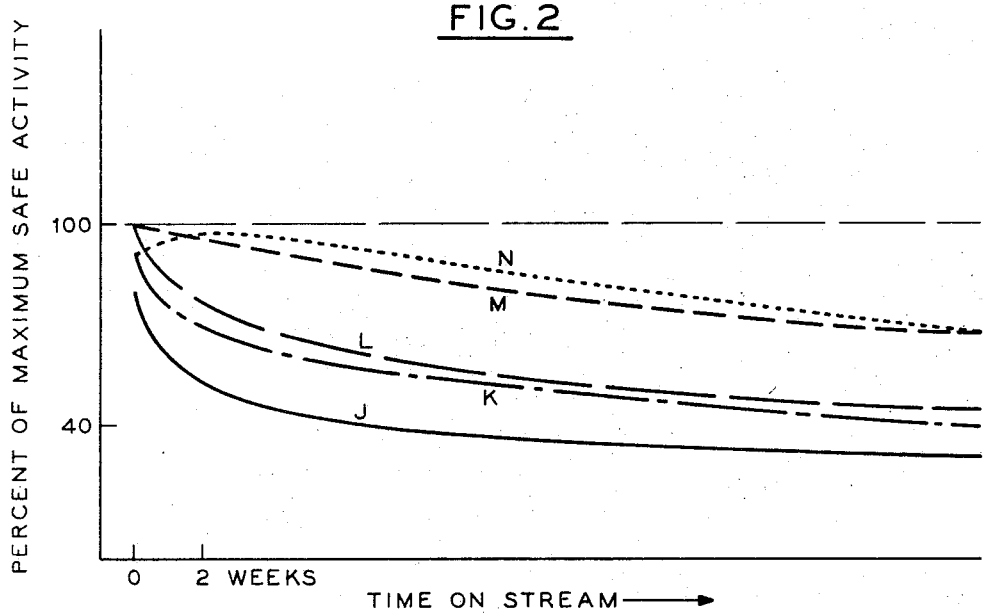

The figures in the attached drawings are presented as an aid in understanding the nature of the invention and the manner of using it. In the attached drawings: FIGURE 1 is a graph illustrating the effects on the activity of a chromia-alumina catalyst of heating at different elevated temperatures in oxygen-free vapor and in oxygen-containing atmospheres;

FIGURE 2 is a graph illustrating the manner in which the activities of various catalysts decline during time on stream when used in the butane dehydrogenation process; and FIGURE 3 is a graph illustrating how the behavior of the catalysts of FIGURE 2 can change when they are prepared in accordance with the invention and then used in the butane dehydrogenation process.

In FIGURE 1, activity measured by active chromia surface area is plotted against temperature of heating in different atmospheres. Measuring catalyst activity by determining active chromia surface area by CO chemisorption, as applied to chromia-alumina catalysts, was disclosed in our previously-mentioned copending application, Serial No. 71,821. The method of carrying out the determination is set forth in a paper entitled, "Flow Adsorption Method for Catalyst Metal Surface Measurement," presented at the symposium, Division of Petroleum Chemistry of the ACS, in Boston, Mass., Apr. 5–10, 1959, by T. R. Hughes, R. J. Houston, and R. P. Sieg. A linear correlation exists between CO chemisorption so determined, in micromols CO per gram of catalyst, and the activity of a chromia-alumina catalyst for the dehydrogenation of butane, in micromols butane converted per second per gram of catalyst, at a given temperature and pressure.

Referring to FIGURE 1, when an overly active chromia-alumina dehydrogenation catalyst is treated with flowing hot vapors free of oxygen, such as hydrogen, nitrogen, carbon dioxide, steam, or mixtures thereof, its chromia surface area and initial activity decline along a curve such as A–B, depending on temperature and chromia content. For example, if an overly active catalyst is heated at $T_1$ in $CO_2$ for four hours, its activity will be at $w$. If the catalyst is then treated with flowing hot vapors containing oxygen, such as air, its CO surface area and initial activity follow a curve such as C–D, or C'–D', depending on temperature. For example, if the catalyst adjusted to activity $w$ were heated in air at $T_2$ for two hours, its activity would then be at $z$ on curve C–D. Almost as high an activity is obtained by heating only to $T_3$ in air.

On the other hand, if the overly active catalyst were heated only to $T_2$ in oxygen-free $CO_2$ vapors, its activity would be at $x$. Then when heated in air at $T_3$, its activity would be at $y$ on the curve C'–D', which is an excessively active condition such that excessively high temperatures can be reached in the catalyst bed when the catalyst is used in a butane dehydrogenation process. The catalyst of activity $x$ becomes overly active when exposed to oxygen at temperatures above $T_4$. If it is possible that $T_4$ might occur in the process while burning coke from the catalyst, at least in localized areas of the catalyst bed, or during upset conditions, there are risks involved in using this catalyst in the process. The catalyst of activity $w$, however, would not be sufficiently active for economical use in the process unless $T_3$ occurred while burning coke from the catalyst.

If the original overly active catalyst is treated with hot vapor containing oxygen, such as air, the chromia surface area and initial activity of the catalyst will fall on a curve such as E–F of FIGURE 1. At a treating temperature of $T_3$ the resulting catalyst still has such excessively high activity that it cannot successfully be used in the process, i.e., it is in the inoperable range. At a treating temperature of $T_2$ the resulting catalyst is still overly active, but operable. It can be used in the process by resorting to a protracted break-in period of operation during startup at low temperature and low conversion until the activity declines into the safe range (which it does rather rapidly). At a treating temperature of $T_1$ the resulting catalyst is in the safe operable activity range. If a catalyst so treated with air (e.g., at $T_2$) is subsequently treated with air at a lower temperature (e.g., at $T_3$), its activity does not change. If subsequently treated with oxygen-free vapor such as $CO_2$ at a higher temperature (e.g., at $T_1$), or at some lower temperatures (e.g., above $T_3$), its activity can then be lowered (but not raised) to a curve such as A–B. Then, if the catalyst is again heated in air, its activity can increase to an intermediate activity, lower than it was after the first heating in air. Thus, the description in the preceding two paragraphs can apply where the original overly active catalyst was prepared by a method including calcining in air, but the relative positions and shapes of curves A–B, C–D, and C'–D' will be different. FIGURE 1 is based on data for an overly active catalyst containing about 30% $Cr_2O_3$ on alumina, prepared by impregnating alumina, steamed down to a BET nitrogen surface area of 90 m.²/gm., with an aqueous chromic acid solution, and then drying at about 400° F. in stagnant air. The method of drying precluded the catalyst ever being exposed to oxygen at temperatures as high as 800° F. prior to the described treatments. The same sort of chart was obtained by applying the described treatments to an overly active 18% $Cr_2O_3$ on alumina catalyst which had been calcined at 1100–1500° F., but the activity curves were displaced vertically upwards in the same temperature range.

A chromia surface area of 15 micromols CO/g. represents approximately the maximum safe activity for a chromia-alumina catalyst to be used in the butane dehydrogenation process without dilution with inert heat retentive solids. Chromia surface areas from above 15 to about 20 micromols CO/g. typify catalysts which would be overly active but operable when so used in the process. At 25 micromols CO/g. the catalyst is excessively overly active. Generally, it is not economical to operate the process with a catalyst of such low activity that its chromia surface area is below 4 micromols CO/g. Thus, chromia surface areas of 6–15 micromols CO/g. represent desirable safe activities. If the catalyst is to be diluted with inert heat retentive solids in the reactors, the catalyst should be more active. The foregoing characterizations of activity ranges should still apply if the chromia surface area is expressed in micromols CO per gram of catalyst plus inert solids.

In the usual practice of the cyclic adiabatic butane dehydrogenation process, the maximum temperature at which air or oxygen-containing flue gas is introduced for burning coke from the catalyst is about 1175–1250° F., and usually the temperature is between 900 and 1200° F., so that the maximum temperature achieved in the catalyst bed in normal operation will be below 1300° F., generally below about 1200° F. It has been found that if a chromia-alumina catalyst containing above 25 weight percent $Cr_2O_3$, which catalyst would normally be excessively overactive (e.g., chromia surface area well above 20 micromols CO/gm.), is prepared for use by treating with hot oxygen-free vapors at a temperature just high enough to reduce its activity into a safe operating range (e.g., 8–12 micromols CO/gm.), and the catalyst is then used in the process with the expectation that exposure to oxygen-containing regeneration gas at a temperature normally occurring in the process, e.g., 1100° F. will cause its activity to increase to the maximum safe activity (e.g., about 15 micromols CO/gm.), such a catalyst is in danger of becoming overly active if the temperature should reach or exceed 1150° F. Similarly, it can be shown that this danger is avoided if the activity of the catalyst is adjusted to a desired activity (e.g., 12–15 micromols CO/gm.) in a safe operating range by treating with oxygen-containing vapors at a temperature at least as high as normally reached in the process (e.g., 1100–1200° F.), after first adjusting the activity down to below the desired activity (e.g., below about 10 micromols CO/gm.) by treating with oxygen-free vapors at an even higher temperature.

In the practice of the invention, therefore, an overly active chromia-alumina catalyst is treated with hot flowing vapor free of oxygen hot enough so that its butane dehydrogenation activity is reduced to such an extent that subsequent treatment with hot air at temperatures normally encountered in the butane dehydrogenation process cannot cause its activity to exceed the maximum safe activity, and then the catalyst is treated with flowing hot vapor containing oxygen hot enough so that its butane dehydrogenation activity is increased to an activity desired for use in the process. The catalyst is thereby prepared for use in the cyclic adiabatic butane dehydrogenation process with less danger of temperature run-away occurring during startup or afterwards, and the catalyst activity will be found to be more stable.

To accomplish this, it is found that the heating in oxygen-free vapor must be at a temperature of above about 1350° F., preferably between 1400 and 1800° F. The heating in oxygen-containing vapor must then be at a temperature at least as high as that normally occurring in the process, i.e., at least 1000° F., but should preferably be below the temperature of heating in oxygen-free vapor. If higher temperatures are used in the treatment with oxygen-containing vapors than were used in the treating with oxygen-free vapors, the CO surface area and activity of the catalyst are extremely sensitive to the temperature used (curve C–D of FIGURE 1 bends over sharply) such that there is danger of over-treating and permanently deactivating the catalyst. For commercial reasons, e.g., limitations imposed by materials of construction, it is much preferred to carry out the treatment in oxygen-free vapors at temperatures between 1500 and 1700° F. as part of the preparation or manufacture of the catalyst, then to place the catalyst in a reactor in the commercial installation, and then to carry out the heating in oxygen-containing vapors in situ, in the commercial plant, at near the maximum temperature obtainable therein. This will usually be between about 1100° F. and 1300° F. Then the catalyst is cooled down to a lower temperature at which the catalyst exhibits desired activity, following which productive operation of the process can be commenced by passing butane-rich vapors through the reactor at conversion conditions.

The method of the present invention is applied beneficially to catalysts which would be overly active if used in the butane dehydrogenation process without such a pretreatment. A catalyst which has been prepared by a procedure including air calcination at such a high temperature as to reduce the catalyst activity into the safe operating range is not particularly improved by treating in accordance with the invention because the combination of heating in oxygen-free vapor and then in oxygen-containing vapor will always result in a catalyst of lower activity than the original catalyst so treated. Referring to FIGURE 2, the curve identified by J shows the manner in which the activity of such a catalyst would normally decline during use in the butane dehydrogenation process. Referring to FIGURE 3, the curve identified by J illustrates the manner in which the properties of such a catalyst would be altered by treatment in accordance with the invention. As shown, the only major change is that part of the initial rapid decline in activity has been eliminated, but the catalyst so treated has at all times a slightly lower activity than it would have had.

On the other hand, catalysts which have been prepared by procedures making them overly active at startup, even only slightly overly active, can be improved by the method of the invention. In the prior art it has not been uncommon to make the catalyst somewhat overly active because it has been observed that the activity of such catalysts declines most rapidly during the first few days or weeks of use. Thus, operators of commercial butane dehydrogenation processes have tolerated the hazards attendant, compensating by operating at low conversion rates and/or eliminating butene recycle from the feed until the initial high activity has worn off, so as to be able later to operate longer at desired conversion rates. When in the prior art it was attempted to make the catalyst less active initially, it was found that the useful life of the catalyst was shortened too much. When an overly active catalyst is prepared for use by treatment in accordance with the invention, it is possible to start up the process without resort to a protracted break-in period of low conversion, and the useful life of the catalyst is not measurably shortened.

Referring again to FIGURE 2, the line labeled K illustrates the behavior of a catalyst of the prior art which is only slightly overly active initially. The line labeled L illustrates the behavior of a catalyst which is extremely overly active initially. The excess activity of Catalyst K during the first week of operation can be compensated for in the above-described manner, i.e., by using low temperatures and low conversions. The excess activity of catalyst L could be compensated for by using a large amount of inert solids in the catalyst bed, but, because the activity declines so rapidly and so much, it would soon be found that the over-all activity of the mixture of catalyst and solids would be unfavorably low. Hence, Catalyst L of FIGURE 2 is commercially inoperable.

Now referring again to FIGURE 3, it is shown how by the treatment in accordance with the present invention the period of initial excess activity can be eliminated from Catalyst K so that the process can be started up without resort to a protracted break-in period of low conversion. The behavior of the catalyst thereafter would be quite similar to that of the untreated catalyst, but a distinct advantage is obtained in process operability. A greater improvement could be achieved in the case of Catalyst L, because with the large amount of excess activity inherent in the catalyst it is possible to make a more favorable adjustment by means of the present invention. As shown, the initial activity can be at the desired maximum safe activity, the initial decline in activity can be slower, and the catalyst can be at all times more active but in the safe operating range. It is not necessary to use such a large dilution with inert solids, so that advantage can be taken of Catalyst L's inherent higher activity as compared to Catalyst K.

Now referring again to FIGURE 2, the line labeled M illustrates the behavior of a catalyst prepared in accordance with the new methods disclosed in our copending application Ser. No. 71,821. The behavior of Catalyst M is that which would be obtained, for example, by using the catalyst at point X of FIGURE 1 directly in the process if the maximum temperature to which it is exposed to oxygen-containing vapors in the process is slightly higher than $T_4$. Thus, as shown in FIGURE 2, this catalyst can become overly active, and it would be necessary to resort to the compensating action used as in the case of Catalyst K of FIGURE 2.

Now referring again to FIGURE 3, there is shown one manner in which the behavior of Catalyst M can be improved by treating in accordance with the present invention. In accordance with the invention the treatment in oxygen-free vapor is carried out at the higher temperature $T_1$ (FIGURE 1) to give a catalyst of activity $w$. This catalyst is then treated with oxygen-containing vapor at a temperature between $T_3$ and $T_2$ whereby the activity of the catalyst is adjusted to the maximum safe activity. Then, as shown in FIGURE 3, Catalyst M start initially at the maximum safe activity and remains close to this high activity for a very long time, and is at all times more active than the other catalysts illustrated.

In the case of chromia-alumina catalysts containing between about 25% and 40% $Cr_2O_3$ it has now been found that treatment with flowing hot air at 1400° F. for two hours, after treatment with flowing hot vapors free of oxygen at between 1400° F. and 1800° F., will adjust the activity of the catalyst to very near the maximum activity obtainable, i.e., the maximum increase is approximated at 1400° F. The exact maximum may occur at a higher or lower temperature. As a test, therefore, a sample of the catalyst treated with hot oxygen-free vapor at 1400–1800° F. can be treated with air at 1400° F. for two hours, and then the maximum activity obtainable can be determined by test in a laboratory reactor or by measuring the surface area by CO chemisorption. Thus, the manufacture of the catalyst can be controlled as follows:

(1) If the maximum activity so determined is in the safe operating range for the particular process unit in which the catalyst is to be used, then it is known that the catalyst treated with hot oxygen-free vapor can be installed in the reactors and the process be started up directly with no danger of the catalyst ever being overly active. In accordance with the present invention, however, before starting up the process the catalyst is treated with hot oxygen-containing vapor to adjust its activity upwards, preferably to the maximum, so that the desired highest safe activity is obtained from the beginning and for a longer time. (See curve M of FIGURE 3.) If the maximum activity so obtainable is well below the maximum safe activity, this indicates that the catalyst is being permanently deactivated before use, so the temperature of treating with hot oxygen-free vapor should be lowered.

(2) If the activity so determined after test heating in air at 1400° F. is in the overly-active-but-operable range, i.e., where the excess activity can be compensated for by using lower temperatures in the process for a time, a highly desirable situation is presented. Ordinarily, the maximum temperature in the butane dehydrogenation process will not reach 1400° F. Consequently, the catalyst treated with hot oxygen-free vapor can be installed in the reactors and the process be started up directly. Although the catalyst may become overly active when exposed to regeneration air at 900–1250° F. in the process, this can be compensated for. (See curve M of FIGURE 2.) In accordance with the present invention, however, before starting up the process the catalyst is treated with hot oxygen-containing vapor at a temperature below 1400° F., preferably in the range 1000–1200° F., which will just adjust the activity to the maximum safe activity. (See curve M of FIGURE 3.) In an embodiment representing an optimization in the invention claimed in our prior copending application Ser. No. 71,821, the temperature of heating with hot oxygen-free vapor is increased so that, when the catalyst is installed in the reactors, the process can be started up directly, and subsequent repeated contacting with hot regeneration air at normal temperatures of 1000–1150° F. will cause the activity to increase gradually just to the maximum safe activity. This is shown as curve N of FIGURE 3. In another embodiment of the invention these concepts are combined. Thus, the catalyst treated with hot oxygen-free vapor is treated with hot oxygen-containing vapor, before or after installing in the reactors, at a temperature of 1100–1200° F. to adjust the activity to slightly below the maximum safe activity. Then, should a higher temperature be reached during regeneration due to some upset, channelling of flow through the catalyst bed causing a "hot spot," or other difficulty occurring, the activity will increase, but not substantially above the maximum safe activity. A highly stable and desired activity is thereby assured.

(3) If the maximum activity so determined by test at 1400° F. in air is in the excessively active range, it may still be possible to adjust to an operable safe activity by treating with oxygen-containing vapor at a lower temperature than 1400° F. However, then there will be ever present the danger that during regeneration a higher temperature may be reached causing activation above the maximum safe activity and even into the inoperable range. In accordance with the invention, therefore, the temperature of treating with hot oxygen-free vapor in preparing the catalyst is increased so as to obtain the situation in one of the preceding two paragraphs.

In the case of an overly active catalyst containing less than about 25% $Cr_2O_3$, i.e., in the range of 15–20% $Cr_2O_3$ heretofore conventionally used, it was found that the situation described in the preceding paragraph (too high a maximum activity) could not be avoided except by doing the heating in oxygen-free vapor at 1800° F. or higher, when $N_2$ was used. This can present serious problems from a practical economic standpoint. Above 1900° F. the alumina may sinter to a very low B.E.T. area, and the catalyst be permanently deactivated, though there is less danger of this occurring in the oxygen-free atmosphere as compared to air. In contrast, the situation described in the preceding paragraph could be avoided by using a temperature of only 1500° F. to treat a 30% $Cr_2O_3$ catalyst with $CO_2$. With $N_2$, a temperature of 1600° F. is adequate.

Thus, the method of the present invention achieves unique advantages when applied to certain catalysts containing between about 25% and about 40% $Cr_2O_3$ supported on alumina, which are overly active as indicated by the active chromia surface area measured by CO chemisorption by the flow adsorption method being above about 20 micromols CO per gram. This applies particularly when the overly active catalyst was formed by a procedure comprising impregnating chromia onto alumina having a B.E.T. surface area above 35 m.²/g. but not substantially above 100 m.²/g., especially alumina obtained by treating alumina of high surface area, i.e., above 200 m.²/g., with steam at 1200–1800° F. for two or more hours. When such alumina is impregnated with a concentrated aqueous solution of a chromium compound decomposable to $Cr_2O_3$ on heating, e.g., chromic acid, the larger pores so obtained in the porous alumina (by the steaming) appear to accept more chromium, and the chromia appears to deposit in "clumps." This is indicated by higher chromia content being obtained on steamed alumina than on high area alumina and by the chromia surface area dropping to below 15 micromols CO/g. when the impregnated alumina is treating with flowing oxygen-free vapor at temperatures above 1400° F. for 2 or more hours.

A 30% $Cr_2O_3$ catalyst with a surface area by CO chemisorption of 10 micromols CO/g. has a metal oxide surface area of about 33 micromols CO per gram of $Cr_2O_3$ (as the alumina adsorbs very little CO). A 20% $Cr_2O_3$ catalyst of surface area 15 micromols CO/g. (typical in the prior art) has a metal oxide surface area of 75 micromols CO per gram of $Cr_2O_3$, indicating that the chromia must be present as smaller particles. As disclosed in our prior application, Ser. No. 71,821, it is believed that these smaller particles are responsible for the rapid activity loss observed in the prior art. Inactive solid solutions of chromia and alumina would form more readily the smaller the particles when exposed alternately to air and butane at the elevated temperatures used in the butane dehydrogenation process, possibly through the mechanism of oxidation $Cr^{+3}$ (in $Cr_2O_3$) to mobile $Cr^{+6}$ (in $CrO_3$), which would occur more readily with smaller particles. The $Cr^{+6}$ dispersing over the alumina surface is believed to carry with it $Cr^{+3}$ which dissolves in the alumina.

It is therefore considered desirable, in forming the overly active catalyst preferred for treatment in accordance with the invention, to avoid the formation of hexavalent chromium. To do this, the impregnated alumina should be dried in a manner which precludes it being exposed to oxygen at temperatures where $Cr^{+6}$ may form and disperse over the alumina, which begins to occur in the neighborhood of 1000° F. Hence, preferably the drying is at below about 800° F., but it can be carried out in air at temperatues as high as 500° F. without ill effect while converting the chromium compound to $Cr_2O_3$.

The source and/or method of preparing the alumina starting material do not appear to be critical, as commercial high grade aluminas from several suppliers have been used successfully. Different batches of identically-designated alumina grade from the same supplier have been found to differ in surface area and also to differ in resistance to surface area reduction by heating in steam, air, or steam-air mixtures. It has previously been found U.S. Patent 2,943,067 to R. P. Sieg) that alumina formed by gelation techniques is advantageously promoted with $K_2O$ when used in a chromia dehydrogenation catalyst, to promote its selectivity stability, whereas alumina formed by the Bayer process is not improved by $K_2O$. By the new treating methods disclosed herein, the selectivity stability of chromia-alumina catalyst is improved so that $K_2O$ may be omitted even from many catalysts using gel-type alumina.

By contacting an overly active catalyst, formed as above described, with oxygen-free vapor at 1400–1800° F. for 2 or more hours there can be prepared a catalyst composed essentially of $Cr_2O_3$ supported on alumina, containing between 25 and 40 weight percent $Cr_2O_3$, having a surface area measured by BET nitrogen adsorption between 35 and 100 m.$^2$/g., having an active chromia surface area measured by the CO flow adsorpition method below 15 micromols CO per gram, and characterized by the property that the active chromia surface increases to 15–20 micromols CO per gram when the catalyst is treated with flowing air at 1400° F. for two hours. If the chromia surface area is below about 10 micromols CO/g., by contacting this catalyst with oxygen-containing vapor at an appropriate temperature in the range 1000–1600° F. for two or more hours there can be prepared a catalyst of the same composition and BET surface area having a chromia surface area between 12 and 15 micromols CO/gram. This represents a highly desirable activity for use in the butane dehydrogenation process. If the chromia surface was between about 6 and 10 micromols CO/g. following the contacting with oxygen-free vapor, the contacting with oxygen-containing vapor to obtain the surface area of 12–15 micromols CO/g. could be at a temperature between 1000 and 1200° F., and the resulting catalyst would still be characterized by its chromia surface area increasing to between 15 and 20 micromols CO/g. when treated with air at 1400° F. for two hours.

The following examples specifically illustrate certain of the facts and observations pointed out above, including preferred practices of the invention.

*Example I*

A high chromia content chromia-alumina catalyst was prepared by compressing purchased high surface area alumina powder (Filtrol 90) in a pelleting machine to obtain structurally rugged 3/16" alumina pellets. The alumina was then treated with a flowing 40% steam—60% air mixture at 1500° F. for about two hours and 1700° F. for about two hours, which reduced the surface area of the alumina from above 250 m.$^2$/gm. to about 100 square meters per gram (BET method). The steamed alumina pellets were then impregnated with chromia by immersing in a concentrated solution of chromic acid containing a small amount of potassium dichromate, in concentrations such that the finished catalyst analyzed 28 weight percent $Cr_2O_3$ and 0.3 weight percent $K_2O$. The impregnated alumina pellets were drained and dried in stagnant air at about 400° F. overnight. The catalyst so prepared has all the outward appearances of a chromia-alumina catalyst suitable for use in the butane dehydrogenation process, and it is active for the dehydrogenation of butane. In fact, the catalyst is so extremely active that it cannot successfully be used in the cyclic adiabatic fixed bed process. The catalyst has a high coke to conversion ratio such that even if low temperatures and low conversions are used when trying to start up the process with the catalyst, an excessive amount of coke is laid down during the conversion period. When this coke is burned off in the regeneration cycle of the process, the catalyst bed becomes too hot so that the conversion in the next succeeding cycle is much greater and an even larger amount of coke is deposited. In attempting to start up the process, this situation arising is detectable by the temperature in the bottom of the catalyst bed following regeneration being substantially hotter than the temperature at the top of the catalyst bed. When this is observed, corrective action of reducing butane feed rate and temperature must be taken, else a "run-away" temperature situation will result. Thus, the catalyst is so overly active for butane dehydrogenation that excessively high temperatures would be reached in the catalyst bed during regeneration in startup operation of the process unless used with a high proportion of inert solids and limited to low per-pass conversion operation until the catalyst was substantially deactivated.

*Example II*

In accordance with our prior application Ser. No. 71,821, a catalyst prepared as in Example I, except using alumina extrusions rather than pellets, which alumina was adjusted to 90 m.$^2$/g. BET area by 100% steam at 1500° F. before impregnation, was treated with flowing carbon dioxide containing trace amounts of hydrogen and nitrogen (being a $CO_2$ by-product stream from an ammonia manufacturing process) and containing no detectable free oxygen at 1480° F. for four hours, which reduced its active chromia surface to about 12 micromols CO per gram. The BET surface area was 60 m.$^2$/g. The catalyst contains less than 0.01 weight percent waterextractible, hexavalent chromium. When this catalyst was used without further treatment in the butane dehydrogenation process, its activity was as shown by curve M of FIGURE 2. Due to the alternate and repeated exposure of the catalyst to oxygen-containing vapors during regeneration at startup air temperatures of about 1025° F., the bottom of the catalyst bed reached a temperature of about 1050° F., which caused the activity of the catalyst to increase above the maximum safe activity. The bottom bed temperature began increasing further. To correct this situation the air and butane inlet temperatures were reduced to below 1000° F. until the excess activity had worn off. Through the second month on stream the operation was stable at a maximum temperature of 1050° F. In contrast, using a commercial catalyst of the prior art as in previous operation in the same unit at the same conversion, similar startup difficulty was encountered for a short time, and by two months on stream it was necessary to use the maximum obtainable air temperature of 1175–1200° F. to maintain the conversion. Curve K of FIGURE 2 is based on the performance of this prior art catalyst.

*Example III*

In accordance with the invention, a catalyst prepared as in Example I was treated with flowing carbon dioxide at 1600° F. for four hours. This treatment reduced the active chromia surface area of the catalyst to about four micromols per gram as measured by the CO flow adsorption method and the BET surface area to 55 m.$^2$/g. This is an unsatisfactorily low activity for use in the butane dehydrogenation process. The catalyst was then treated with flowing air at 1400° F. for two hours. The active chromia surface of the catalyst was then found to be 14 micromols CO per gram, which is a highly desirable activity level for use in the butane dehydrogenation process. The catalyst contains only 0.04 weight percent water-extractible hexavalent chromium as compared to over 0.5 weight percent water-extractible hexavalent chromium typically found in prior art commercial catalysts of lower $Cr_2O_3$ content after calcining at 1400° F. Treatment of the catalyst in flowing air at higher temperatures or lower temperatures produces a catalyst having a lower chromia surface area and lower activity. Thus, this is the maximum activity obtainable after the catalyst has been heated in carbon dioxide at 1600° F., and there is no possibility of the catalyst ever being overactive. When this catalyst heated in air at 1400° F. is used in the butane dehydrogenation process, its initial activity is close to the maximum safe activity, and it declines only slowly in activity in the manner shown by curve M of FIGURE 3.

*Example IV*

In accordance with the invention, a catalyst is prepared as in Example I and then heated in flowing carbon dioxide at 1510° F. for four hours. The surface area is then 8 micromols CO/g. The catalyst is then installed in the reactors of a butane dehydrogenation plant. The catalyst is then contacted in situ with air at about 1100–1150° F., which partially raises the catalyst activity towards the maximum safe activity, to about 13 micromols CO/g. When the process is then brought on stream, the catalyst follows a curve intermediate to M and N of FIGURE 3. The activity of the catalyst does not increase unless and until the temperature to which it is exposed in the presence of oxygen-containing gas in the process exceeds 1150° F. Temperatures high enough to cause the catalyst to become overly active are not achieved in the process. Air at 1400° F. for two hours increases the chromia surface area to 21 micromols CO/gm.

*Example V*

Another catalyst proposed to use in the butane dehydrogenation process contained only 18 percent $Cr_3O_3$ but it was also overly active, having a chromia surface area of 30 micromols CO per gram. This catalyst was treated with flowing nitrogen at 1800° F. for four hours, which reduced the chromia surface area to about 9 micromols CO per gram. The catalyst was then treated with air at 1100° F., which increased the chromia surface area to 13 micromols CO per gram. When treated in air at 1400° F., the chromia surface area increased to 20 micromols CO per gram. When the original over-active catalyst was treated with flowing nitrogen for four hours at 1600° F., the chromia surface area was reduced only to 16 micromols CO per gram, and on heating in air at 1400° F. for two hours the chromia surface area increased to 27 micromols CO per gram. Thus, it is considerably more difficult to prepare by the method of the invention a catalyst suitable for starting up directly in the butane dehydrogenation process from this lower chromia content catalyst as compared to the catalysts of Examples I through IV. By treatment in oxygen-free atmosphere at temperatures of 1700–1800° F. followed by treatment in oxygen-containing atmosphere at temperatures of 1000–1200° F., however, it should be possible to prepare from the lower chromia content catalyst a catalyst which will follow substantially the curve labeled L of FIGURE 3. It will be noted that this is a substantial improvement over the behavior of catalyst L illustrated in FIGURE 2, said curve having reference to the overly-active catalyst treated in this example.

The method of the present invention is also a method of altering the coke to conversion ratio of an overly active catalyst to a more operable ratio whereby the catalyst does not produce excessive coke and the occurrence of a run-away temperature situation is thereby avoided. This is shown by the following data.

*Example VI*

Portions of a catalyst which had been prepared as in Example I were heated in carbon dioxide at temperatures of 1350° F., 1400° F., and 1500° F. The catalyst treated at 1350° F. produced 1.7 weight percent coke while converting 56 weight percent of the feed in a standard activity test, a coke to conversion ratio of 0.03. When the catalyst was treated at 1400° F., the coke to conversion ratio was .016; and when treated at 1500° F., the coke to conversion ratio was 0.01. The coke to conversion ratio of the catalyst treated at 1350° F. is undesirably high. For this reason, therefore, it is desirable to use in the treating with oxygen-free vapors temperatures of above 1400° F. The more desirable coke to conversion ratio thereby obtained is retained when the catalyst is subsequently treated with oxygen-containing vapors and used in the process.

The heating of the catalyst in oxygen-free vapors in accordance with the invention includes treating with flowing vapors such as hydrogen, nitrogen, carbon dioxide, mixtures of any two or three of these, as well as treatment with other vapors or inert gases which do not contain or provide at the treating conditions free oxygen. When the treatment is applied to a catalyst which has not already been calcined in air (the preferred situation for the production of the most stable catalysts of this invention) oxygen will be released slowly as $CrO_3$ is converted to $Cr_2O_3$. For this reason the hot vapors are flowed countercurrently into and out of contact with the catalyst, whereby the oxygen produced is rapidly carried away in very low concentration, and the catalyst is only exposed to this small amount of oxygen before reaching the high temperature. In Example III, for example, the contacting with oxygen-free vapor was accomplished by flowing 30.5 pounds per hour of $CO_2$ per cubic foot of catalyst up through a gravitating column of catalyst at a linear velocity of $CO_2$ relative to catalyst of 5 feet per second at 1600° F.

As the oxygen-free vapors there have been used steam, $CO_2$, $H_2$, $N_2$ and argon. The gases are ranked substantially in the order just listed with reference to their effectiveness in lowering the chromia surface area at a given temperature. Although pure steam uncontaminated with air is the most effective agent, it is less suitable than the preferred agent, $CO_2$, because with steam there is a danger of "over-shooting" and reducing the activity too much, such that it cannot be restored by subsequent treatment with oxygen-containing vapors. The vapor used need not be a reducing gas, but must not be an oxidizing gas. As a guide, it should contain no free $O_2$ detectable by an oxidation test such as Orsat analysis.

The subsequent treating with oxygen-containing vapors may be with air or mixtures of air with inert gases, such as $N_2$, or with oxygen-depleted flue gases containing substantially less oxygen than air or with air-flue gas mixtures. The vapors must, however, contain or provide free oxygen. The oxygen content should be sufficient to support combustion of coke, as a guide, preferably at least about 5 mol percent $O_2$.

The time of treating with oxygen-free vapors and the time of treating with oxygen-containing vapors are not as critical variables as the temperatures used in each step. Thus, treating an overly active catalyst with nitrogen at 1300° F. for 44 hours does not reduce the activity and chromia surface area as much as treating for only four hours at 1400° F. A similar situation is observed in the treating with air or other oxygen-containing vapors. A treating time of at least about two hours is suggested in order to assure that all of the catalyst has been brought to the desired temperature. Obviously, it is desirable to use the minimum treating time consistent with insuring that the catalyst is uniformly adjusted to the desired activity and chromia surface area.

To summarize, it has been shown that by preparing a catalyst for use in the butane dehydrogenation process in accordance with the present invention, an unsuitable catalyst can be made suitable, and catalysts which are already suitable can be improved. By eliminating or minimizing the dangers attendant upon excess activity, the operation of the dehydrogenation process is improved. The coke: conversion ratio is improved. Also, it is shown that certain catalysts prepared by the novel method disclosed in our prior copending application Ser. No. 71,821 can be further improved with respect to extending their useful life and minimizing or eliminating operational difficulties sometimes encountered in starting up the process with the fresh catalyst charge.

What is claimed:

1. The method of pretreating a chromia-alumina catalyst for use in a fixed-bed, cyclically operated, butane dehydrogenation process to improve the operation thereof, said catalyst being of a type which would normally be overly active for butane dehydrogenation when first used such that excessively high temperatures would be reached in the catalyst bed during regeneration in startup operation of the process unless limited to low per-pass conversion operation until the catalyst is substantially deactivated, which method comprises: treating said catalyst with flowing hot vapor free of oxygen at between 1400° F. and 1800° F. until the butane dehydrogenation activity of the catalyst has been decreased to lower than desired for use in said process, and then treating said catalyst with flowing hot vapor containing oxygen at between 1000° F. and 1800° F., until the butane dehydrogenation activity of the catalyst has been increased to substantially the activity desired for use in said process whereby the possibility of reaching excessively high temperatures in the catalyst bed during regeneration, in subsequent startup operation of the process at desired high per pass conversion, is substantially eliminated.

2. The method of claim 1 wherein said hot oxygen-free vapor is a gas selected from the group consisting of $H_2$, $N_2$, $CO_2$, $H_2O$, and mixtures thereof.

3. The method of claim 1 wherein said hot oxygen-free vapor is essentially $CO_2$.

4. The method of claim 1 wherein said hot oxygen-containing vapor is a mixture of oxygen and inert gases, said mixture being selected from the group of mixtures consisting of air, flue gas, mixtures of air and flue gas, and mixtures of air and $N_2$.

5. The method of claim 1 comprising treating said overly active catalyst with $CO_2$ at 1500–1700° F. and then with air at 1100–1400° F.

6. The method of claim 1 wherein said chromia-alumina catalyst has a chromia content of at least 25% by weight, expressed as $Cr_2O_3$.

7. The method of starting up a fixed bed, cyclically operated, butane dehydrogenation process, which method comprises:

(1) charging the reactors of said process with a low activity chromia-alumina catalyst which was prepared by a method comprising treating an overly active chromia-alumina catalyst with flowing hot vapors free of oxygen at between 1400 and 1800° F. until the butane dehydrogenation activity was decreased to lower than desired for use in said process;

(2) passing oxygen-containing vapor through the reactors containing said low activity catalyst at a temperature near the maximum temperature normally attained in the operation of said process, between 1000° F. and 1400° F., until the butane dehydrogenation activity of said catalyst has increased to an activity desired for use in said process;

(3) then adjusting the catalyst temperature to a lower temperature at which the catalyst exhibits the desired activity in terms of percent conversion of butane at normal process throughput; and then (4) commencing productive operation of the process by passing butane-rich vapors through a reactor containing the catalyst of increased activity at conversion conditions.

8. The method of claim 7 wherein said oxygen-containing vapor is a mixture of oxygen and inert gases selected from the groups of mixtures consisting of air, flue gas, mixtures of air and flue gas and mixtures of air and $N_2$.

9. The method of claim 7 wherein said low activity chromia-alumina catalyst charged to said reactors contains between 25 and 40 weight percent $Cr_2O_3$, has an active chromia surface area as measured by CO chemisorption of less than 10 micromols of CO per gram and a surface area measured by BET nitrogen adsorption of at least 35 square meters per gram, produced by a method comprising impregnating alumina having a surface area measured by BET nitrogen adsorption above 35 square meters per gram with a chromium compound decomposable to $Cr_2O_3$ on heating and then drying the impregnated alumina in a manner which precludes exposing the catalyst to oxygen at a temperature above about 800° F., thereby providing said overly active catalyst having a chromia surface area above 20 micromols CO per gram, and then treating the overly active catalyst as aforesaid with flowing hot vapors free of oxygen at between 1400 and 1800° F. until the chromia surface area was lowered to below 10 micromols per gram, thereby forming said low activity catalyst.

References Cited

UNITED STATES PATENTS

| | | | |
|---|---|---|---|
| 2,857,442 | 10/1958 | Hay | 252—465 X |
| 2,943,067 | 6/1960 | Sieg | 252—465 |
| 3,064,062 | 11/1962 | Lorz et al. | 260—680 |
| 3,189,661 | 6/1965 | Mulaskey et al. | 260—680 |

DELBERT E. GANTZ, *Primary Examiner.*

R. SHUBERT, G. J. CRASANAKIS, *Assistant Examiners.*